United States Patent [19]
Kaidou

[11] Patent Number: 5,367,277
[45] Date of Patent: Nov. 22, 1994

[54] ELECTROMAGNETIC ENERGY CONVERTER

[75] Inventor: Chikara Kaidou, Futtsu, Japan

[73] Assignee: Nippon Steel Corporation, Tokyo, Japan

[21] Appl. No.: 917,982

[22] Filed: Jul. 24, 1992

[30] Foreign Application Priority Data

Jul. 25, 1991 [JP] Japan .................................. 3-186656
Oct. 15, 1991 [JP] Japan .................................. 3-293783

[51] Int. Cl.$^5$ .............................................. H01F 7/00
[52] U.S. Cl. .................................. 335/229; 335/231; 335/234
[58] Field of Search ............... 335/229, 230, 231, 234, 335/236; 361/209, 208

[56] References Cited

U.S. PATENT DOCUMENTS

3,161,793 12/1964 Laithewaite ......................... 335/231
3,460,080 8/1969 Carbonaro ........................... 335/231
3,478,289 11/1969 Parnell ................................ 335/231

*Primary Examiner*—Lincoln Donovan
*Attorney, Agent, or Firm*—Wenderoth, Lind & Ponack

[57] ABSTRACT

An electromagnetic energy converter comprises a frame-like magnet core, a closed magnetic path being formed along the sides of the magnetic core, a winding wound around the magnet core and connected to a power supply or a load, an armature conductor having a frame-like body forming a closed electric circuit and having a portion of the magnet core passed therethrough, and a field magnet disposed so that the magnetic flux generated thereby passes through the magnet core and armature conductor. One of the winding, armature conductor and field magnet is movable with respect to the magnet core. Electric power is transmitted between the winding and armature conductor by electromagnetic induction, and conversion of electromagnetic energy takes place between the magnetic flux generated by the field magnet and the armature conductor through the displacement of the movable part.

31 Claims, 4 Drawing Sheets

FIG. 11

ELECTROMAGNETIC ENERGY CONVERTER

BACKGROUND OF THE INVENTION

1. Field of the Invention

This invention relates to energy converters, and more particularly to apparatus that transform electrical energy into mechanical energy or vice versa by way of magnetic energy. The energy converters according to this invention are used, for example, as linear motion actuators of voice coil motors.

2. Description of the Prior Art

An electric motor and an electric generator comprise a field magnet and an armature, with a permanent magnet or an electromagnet used as the field magnet. While small direct-current motors with brushes, brushless motors and synchronous motors extensively use permanent magnets, induction motors use electromagnets. Electric current is generally supplied to the movable part directly from a supply circuit. With induction motors, by contrast, electric current is induced to the armature by electromagnetic induction.

Recently, faster response, larger output and smaller size are required of motors and generators. Response time can be improved by either alleviating the load on the movable part or applying suitable control. If the load is great, however, improvement by control cannot be achieved because of the limit of power supply voltage. If the demand for quick response is acute, accordingly, reduction of the toad is an indispensable prerequisite. This is the reason why the weight reduction of the movable part is essential. For this reason, many coreless and voice coil motors dispense with the magnetic core or coil bobbin, with their movable part consisting of the armature's winding alone.

Measures to attain larger output and smaller size include the use of high-energy magnets made of rare earth elements and the reduction of the gap between the movable and stationary parts by increasing the accuracy of working and assembling. Coreless and voice coil motors, for example, use armature cells wound with high accuracy. Another measure to achieve output increase and size reduction comprises the use of lead wire coated with heat-resisting insulating material and heat-resisting adhesives to permit passing more current through the coils.

Despite these improvements, however, conventional motors and generators have been unable to fully satisfy the needs for faster response, larger output and smaller size as many problems are involved in the weight reduction of their movable part, improvement in the dimensional accuracy of windings, and enhancement of the heat resistance of coil insulators and adhesives. In particular, lightweight windings possessing both great dimensional accuracy and high heat resistance are difficult to obtain.

SUMMARY OF THE INVENTION

The object of this invention is to provide a new type of electromagnetic energy converter having a lightweight movable part made with great dimensional accuracy and high heat resistance, with a view to increasing response speed and power output and decreasing converter size.

An electromagnetic energy converter of this invention comprises a frame-like magnetic core made up of, for example, thin laminated magnetic material, a closed magnetic circuit being formed along the sides of the magnetic core, a winding wound around the magnetic core and connected to a power supply or a loading circuit, an armature conductor having a frame-like body forming a closed circuit and attached to the magnetic core so that one side of the magnetic core passes through the frame-like body, and a field magnet disposed so that magnetic flux passes through the magnetic core and armature conductor, with one of the winding, armature conductor and field magnet being movable with respect to the magnetic core.

The armature conductor performs conversion into and from mechanical energy by the use of the voltage induced by a change in the magnetic flux passing through the magnetic core and, therefore, does not essentially have an external power source. Usually, a metal block is used as a one-turn short-circuit coil. Which of the armature conductor, field magnet and winding should be made movable is not a limited but a relative choice. Usually, however, the armature conductor, whose weight can be readily reduced, is made movable.

When the apparatus described above is used as an electromagnetic driver, an induction current induced in the armature conductor by the voltage applied or current passed, either directly or indirectly, from a driving circuit to the winding is used as the armature current. Electric power is converted into mechanical energy between the armature current flowing through the armature conductor and the magnetic flux from the field magnet. When the apparatus is used as an electromagnetic generator, mechanical energy supplied from the movable part is converted into electric power induced by the armature conductor through the magnetic flux from the field magnet. The generated power is transferred to the winding by means of electromagnetic induction between the armature conductor and winding, and the obtained electric energy is directly or indirectly supplied to a load connected to the winding. The electromagnetic energy converters according to this invention can be used as motors and generators of ordinary type, those of linear type, actuators, speakers, microphones and other devices.

The electromagnetic energy converters of this invention are new in that the armature conductor, driving circuit and generated power are not directly connected to the load but indirectly by means of the winding and electromagnetic induction. Though the electromagnetic energy converters of this invention, unlike the conventional induction-type devices, require a separate winding for magnetizing in addition to the permanent magnet or electromagnet, they have their own unique advantages.

With the conventional induction-type electromagnetic energy converters, energy density drops when their size is reduced. By comparison, some of the electromagnetic energy converters of this invention use permanent magnets of rare earth elements as the magnetizing source. Therefore, energy density remains unchanged even when their size is reduced. As such, the electromagnetic energy converters of this invention can be readily made small in size. The armature conductor of the electromagnetic energy converters of this invention can be made up of not only a coil of lead wire alone, but also an integral piece of conductive material. This design permits high-precision working and assembling and minimizing the gap between the stationary and movable parts, which, in turn, brings about high energy density and adds to the rigidity of the armature conductor. If the armature conductor is on the movable, response time can be improved by the use of lightweight aluminum and duralumin. Furthermore, the integral movable armature conductor may be integrated with a device to be connected thereto. When the electromagnetic energy converter is used as a motor, for example, the integral movable armature conductor may be integrated with a load. When the converter is used as a generator, the armature conductor may be integrated with a device to input mechanical energy.

BRIEF DESCRIPTION OF THE DRAWINGS

FIG. 4 shows vertical cross-sectional views of different types of magnet cores: a coiled magnet core at FIG. 4(a); a laminated magnet core at FIG. 4(b); and a lapped magnet core at FIG. 4(c).

DESCRIPTION OF THE PREFERRED EMBODIMENTS

Preferred embodiments of an electromagnetic energy converter according to this invention are described in the following paragraphs.

The magnet core must be made of a magnetic material having a high magnetic permeability. Magnetic materials having high magnetic permeabilities, such as silicon steel, ferronickel, ferrocobalt and other similar alloys, soft ferrite and amorphous magnetic materials, are preferable. Magnetic materials having low iron losses, such as sheets of magnetic materials having a thickness of not larger than 0.2 mm, wires of magnetic materials having a diameter of not larger than 0.2 mm, magnetic materials having an electric resistance of not smaller than 30 $\mu\Omega$cm, and magnetic materials with finely divided magnetic domains, are also preferable as they provide high energy conversion efficiency and excellent high-frequency performance. When driven at high frequencies, soft ferrite and silicon steel containing not less than 4% silicon have an electric resistance of 30 $\mu\Omega$cm or above. Sheets of magnetic materials having a thickness of over 0.2 mm, wires of magnetic materials having a diameter of over 0.2 mm, magnetic materials having an electric resistance of under 30 $\mu\Omega$cm, and magnetic materials without finely divided magnetic domains induce eddy currents in themselves to increase iron loss or power loss and produce an adverse effect on controllability. The magnet core may be coated with nickel to increase rust resistance or otherwise treated to increase mechanical strength.

A magnet core made of a thin material having high magnetic permeability and electric resistance induces sufficient electric current in the armature conductor. If the readily magnetizable axis of the magnet core material is oriented along the flow of the magnetic flux, the current induction rate to the armature conductor can be increased even at low frequencies, which, in turn, results in the improvement of response at low frequencies.

The magnet core may be any of the coiled, laminated or lapped type. A coiled magnet core comprises a foil or sheet of magnetic material that is coiled in the direction in which the material can be readily magnetized. The readily magnetizable direction means the direction in which the readily magnetizable axis of the crystal grains of a material extends or a direction close thereto. In the case of a polycrystalline material, the readily magnetizable direction means the direction in which the readily magnetizable axes of the crystal grains are heavily distributed or a direction close thereto. A laminated magnet core comprises sheets of magnetic material that are placed one on top of another so that the direction of the magnetic flux to induce an electric current in the armature conductor agrees with the direction in which the material is readily magnetizable. A lapped magnet core is a variation of the laminated magnet core, in which staggeringly bisected pieces of magnetic material having sides of different lengths are alternately laminated. This design permits the use of split laminations while minimizing an increase in the magnetic reluctance of the magnet core. If the gap between the lapped layers is g, the length of the magnetic path formed by the armature current is l, the thickness and specific magnetic permeability of the magnetic material making up the magnetic core are t and $\mu$, and the width of lapping is w, and their relationship is kept as expressed by $w \geq 2\ gt\mu/l$, the magnetic resistance of the lapped area can be kept at a preferably low level.

The magnet core should preferably be designed to extend along the flow of the magnetic flux generated by the electric current flowing through the winding or armature conductor or the magnetic path. The magnet core may be made of E-shaped or I-shaped laminations having cut edges facing the magnetic path. However, cut-edge-free laminations are preferable.

The magnet core may be quadrilateral, with the winding and armature conductor provided on one or more of the four sides thereof. Preferably, the magnet core should have four sides plus one piece that connects two opposite sides of the quadrilateral to bisect it into two smaller quadrilaterals, with the armature conductor provided on the bisecting piece in the middle and the winding in a suitable symmetrical position. This type of magnet core enhances the function of the armature conductor and assures efficient conversion between electrical and mechanical energies. A preferable arrangement for this type of magnet core is to laminate two sets of E-shaped pieces facing each other so that the individual sides are lapped in the middle. This arrangement permits mounting a jointless armature conductor over the central core, which, in turn, prevents the deterioration thereof due to the contact resistance that might be built up by a joint in the armature conductor. By choosing a suitable position, furthermore, a winding preliminarily wound around a bobbin may be used, as will be discussed later.

This magnet core may consist of a yoke of a permanent magnet used as the field magnet.

A winding is prepared by winding a lead wire, and one or more windings may be provided to receive electrical energy from a driving circuit connected to an input/output conductor or supply generated electrical energy to a load connected to an input/output conductor. Being connected to a control circuit etc., the winding is usually placed on the stationary part. As the stationary and movable parts are generally relative, however, the winding may also be placed on the movable part so long as the control circuit can function. Otherwise, both of the field magnet and armature conductor may be designed to be movable so that either one can be fixed and the other one moved depending on the operating condition of the converter.

If a winding is provided around that part of the magnet core which is surrounded by the armature conductor or which is contained in the same cross-section in which the armature conductor is located, the amount of magnetic flux intersecting with the magnet core increases. This increase allows adequate power transmission by electromagnetic induction, decreases leakage flux, and improves response. If, by contrast, a winding is provided around that part of the magnet core which is not contained in the same cross-section in which the armature conductor is located or outside the cross-section in which the armature conductor and field magnet are located, the inducting force of the same winding and the voltage of the generated power with respect to the same displacement can be increased. The position of the winding is not specifically limited. A preferable position is where more than 50% of the magnetic fluxes generated by the winding and armature conductor intersect with each other. When two or more windings are used, the position and direction of each coil must be carefully chosen to increase the percentage of the intersecting magnetic fluxes.

The armature conductor may consist of several windings or a solid piece of a conductor such as aluminum, copper or duralumin. With an armature conductor made up of windings, the leading and tail ends thereof are usually short-circuited. Instead, a circuit element or a control circuit may be connected to the windings so that the armature current flows therethrough by the action of induced voltage. A control circuit may also be provided to a converter that uses an electromagnet as the field magnet, which also permits control from the armature conductor or field magnet coil.

If some oxidation preventing measure is applied to the bonded surfaces of pieces of aluminum or duralumin that make up an armature conductor, an increase in contact electric resistance may possibly result. As this oxidation preventing measure, therefore, nickel or copper plating is preferable as the increase in electric resistance resulting from the surface oxidation of aluminum or duralumin sheets is moderate. An oxidation preventing measure such as nickel plating keeps the resistance of the armature low and assures good performance even at low frequencies.

In a conventional electromagnetic energy converter, the armature conductor is designed to pass as much current as possible in a limited space to increase energy density. This design limits the dimensional accuracy of the wound winding. The insulation of the wire and the use of bonding agent also give rise to problems concerning heat resistance and gas liberation. By comparison, the armature conductor of this invention can be made up of an integral piece of conductive material that can be fabricated with high accuracy. Besides, the integral armature conductor has no thermal problem in itself. Its thermal limitations are imposed only by the heat transfer or radiation by other parts.

Though either a permanent magnet or an electromagnet can be used as the field magnet, a permanent magnet is easy to use in many cases. The field magnet may be either stationary or movable, and it must be placed in a position where maximum magnetic flux intersection with the armature conductor is obtainable. Higher energy conversion efficiency is obtained if the movable part (usually the armature conductor) moves perpendicularly to the magnetic flux of the field magnet. Parts arrangement of the converter can be streamlined if the yoke to form the magnetic path of the field magnet serves also as the magnet core.

To attain a sufficiently high electromagnetic energy conversion efficiency, the winding should preferably be placed in a position where the density of the magnetic flux generated by the field magnet is low. The armature conductor should preferably be placed in a position where the density of the magnetic flux generated by the field magnet is sufficiently high so that the intersecting magnetic flux of the field magnet changes greatly with the movement of the movable part. Also, the movable part should preferably be designed to move in a direction perpendicular to the magnetic flux of the field magnet.

If the field magnets, windings, armature conductors and magnet cores are disposed substantially symmetrically with respect to a plane containing the center and moving direction of the armature conductor, efficient conversion between electrical and mechanical energies can be achieved between the armature conductor and field magnet.

A particularly preferable embodiment comprises a lapped magnet core that is made up of two facing sets of E-shaped pieces of magnetic material that are interleaved with each other. An armature conductor is mounted in the middle of the central core of the magnet core so as to be movable along the central core. Windings are provided at both ends of the central core that are outside the travel range of the armature conductor. Field magnets are provided in contact with the middle part of and on the inside of the outer yokes. A variation of this type comprises a lapped magnet core made up of two facing interleaved sets or E-shaped pieces of magnetic material, with a winding provided over the entire length of the central core thereof and an armature conductor around the winding so as to be movable along the central core. Field magnets are provided in contact with the middle part of and on the inside of the outer yokes. Another preferred embodiment features a flat profile. While the magnet core is a lapped core made up of two facing interleaved sets of E-shaped pieces of magnetic material, the armature conductor is provided on the central core so as to be movable parallel to the yokes thereof. A winding is provided around each of the outer legs, while field magnets are provided on the inside of and In contact with at least one of the outer yokes. A variation of this type comprises a lapped magnet core made up of two facing interleaved sets of E-shaped pieces of magnetic material. A winding is provided around the central core of the magnet core, while the armature conductor is provided around the winding so as to be movable parallel to the yokes thereof. Field magnets are provided on the inside of and in contact with at least one of the yokes.

When good controllability is required, cogging or variations in torque must be eliminated. The electromagnetic energy converters of this invention provide good controllability without creating cogging when the field magnet is used as the stationary part and the armature conductor is not used as the movable part. Even when the armature conductor is used as the movable part, the lead wire connected to the movable part can be dispensed with. Accordingly, problems associated with the maintenance of the brush and commutator of direct-current motors with a brush and with the breaking of the lead wire connected to the movable armature. An electromagnetic energy converter according to this invention employing a lapped core as the magnet core of a closed magnetic path to pass through the winding and armature conductor can be made easily as a coil preliminarily wound around a bobbin can be fit in the magnet core instead of wrapping wire therearound. Furthermore, the armature conductor may be made up of an integral joint-free metal frame. The absence of joints prevents the undesirable buildup of electrical resistance and, therefore, improves the performance of the converter at low frequencies. The electromagnetic energy converters of this invention provide high power output and fast response while facilitating the fitting of windings and armature conductors on the magnet core. Also, the electromagnetic energy converters of this invention can be designed in a flat profile according to space limitations.

Now more concrete structures of electromagnetic energy converters according to this invention will be described by reference to the accompanying drawings.

Figure 1:
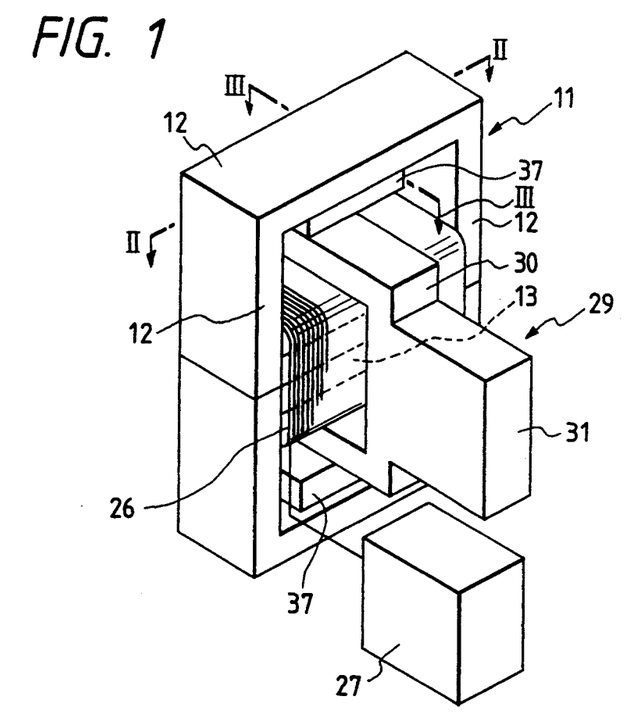
FIG. 1 is a perspective view showing a preferred embodiment of an electromagnetic energy converter according to this invention.
Figure 2:
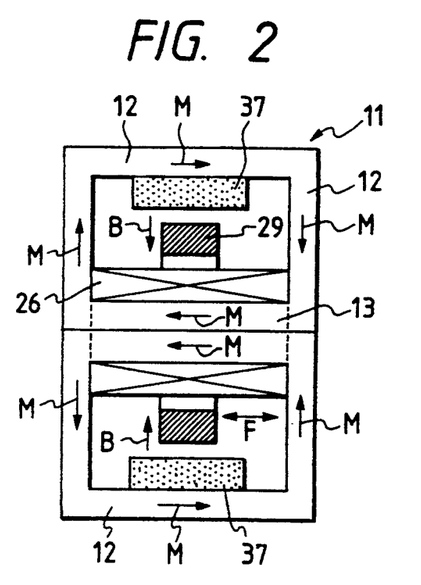
FIG. 2 is a cross-sectional view taken along the line II—II in FIG. 1.
Figure 3:
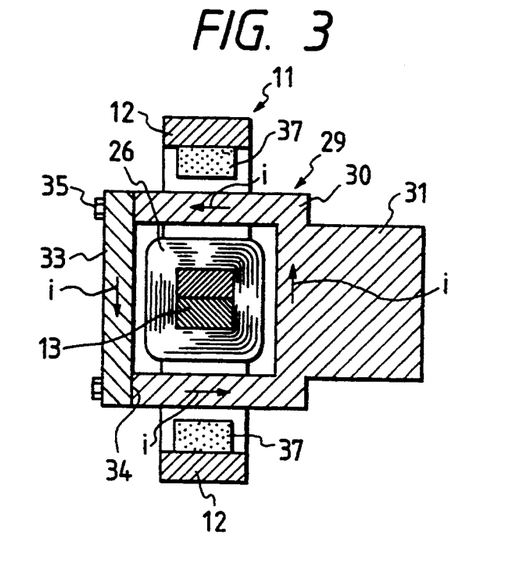
FIG. 3 is a cross-sectional view taken along the line III—III in FIG. 1.

FIGS. 1 to 3 show an electromagnetic energy converter embodying the principle of this invention. As illustrated, the electromagnetic energy converter consists essentially of a magnet core 11, a winding 26, an armature conductor 29 and permanent magnets (field magnets) 37.

The magnet core 11 is a rectangular frame-like structure consisting of yokes 12 and a central core 13. The magnet core 11 is made up of a stack of sheets of grain-oriented electrical (silicon) steel, the stack being formed by coiling, laminating or lapping. The thickness of the sheet of electrical steel is between approximately 0.02 mm and 0.2 mm. A closed magnetic path is formed along the yokes 12 and central core 13. The readily magnetizable axis of the grain-oriented electrical steel sheets (indicated by arrow H) extends along the closed magnetic path. The magnet core 11 serves not only as the core of the winding 26 and armature conductor 29, but also as the yoke of the permanent magnets 37.

Figure 4A:
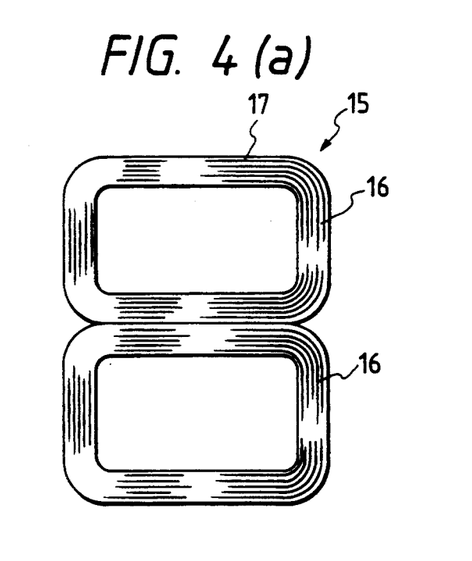
Figure 4B:
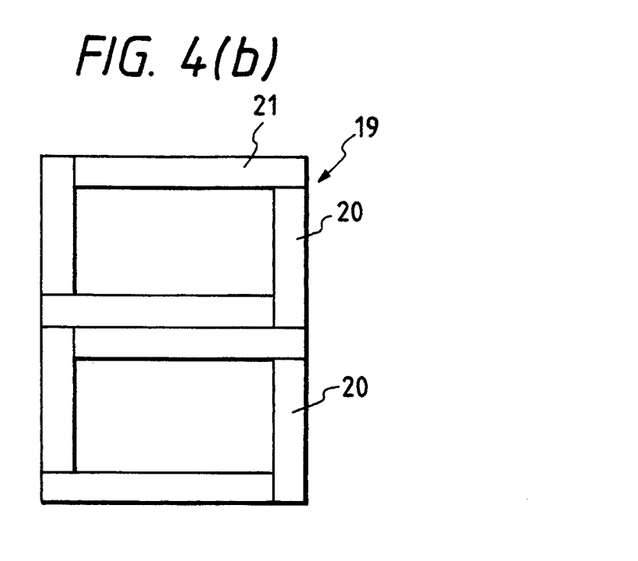
Figure 4C:
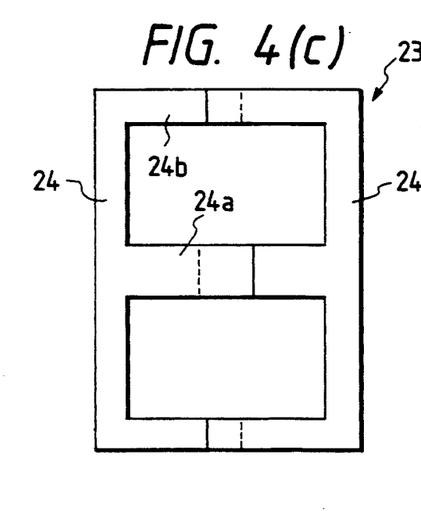

The magnet core 11 may be any of the coiled, laminated and lapped type. FIG. 4(a) shows a coiled magnet core 15 which is made up of two smaller magnet cores 16 whose central cores are assembled together to form a single unit. Each smaller magnet core 16 is made up of a long strip of electrical steel 17 that is wound into successive layers making up a rectangular frame-like structure. The coiled magnet core 15 is continuous throughout, from the innermost layer of the electrical steel 17 to the outermost one. FIG. 4(b) shows a laminated magnet core 19 which is also made up of two smaller magnet cores 20 whose central cores are assembled together to form a single unit. Each smaller magnet core 20 is made up of short strips of electrical steel 21 that are laminated, one on top of another, to form a rectangular frame. FIG. 4(c) shows a lapped magnet core 23 which is made up of two facing sets of E-shaped electrical steel blanks 24 whose facing ends are interleavingly lapped together. As is obvious from the illustration, the central core 24a and legs 24b of the electrical steel blanks 24 are lapped over different lengths.

The winding 26 is made up of copper wire coated with an insulating material wound around the central core 13 of the magnet core 11. The winding 26 is connected to either a driving or a loading circuit 27 (connection in this preferred embodiment being made to a driving circuit including a power supply).

The armature conductor 29 is an assembly of machined aluminum pieces that make up a rectangular frame consisting of a fork-shaped part 30 and a plate-like yoke 33. The contacting surfaces 34 of the fork-shaped part 30 and yoke 33 are nickel-plated and fastened together with bolts 35. The fork-shaped part 30 and yoke 33 form a closed circuit. The armature conductor 29 is attached to the magnet core 11 so that the central core 13 of the magnet core 11 carrying the winding 26 passes through the rectangular space surrounded by the fork-like part 30 and yoke 33. A lever 31 on the fork-shaped pare 30 serves as an output terminal.

The field magnet consists of two facing permanent magnets 37 of ferroneodyminum. The two magnets 37 are fastened to the opposite yokes 12 of the magnet core 11 so that the magnetic flux B passes through the magnet core 11 and armature conductor 29. The permanent magnets 37 magnetize in the direction in which the magnetic poles thereof face each other.

In the electromagnetic energy converter just described, a pulsed voltage is applied from the driving circuit 27 to the winding 26. The resulting change in the magnetic flux of the winding 26 generates an induced current i in the armature conductor 29 that flows around the fork-shaped part 30 and yoke 33. The magnetic flux B generated by the permanent magnets 37 flows through the yokes 12 and central core 13 of the magnet core 11, crossing the fork-shaped part 30 of the armature conductor 29 midway. The interaction between the induced current i in the armature conductor 29 and the magnetic field formed by the permanent magnets 37 creates a force in the armature conductor 29 as indicated by arrow F, whereby the armature conductor 29 moves along the central core 13 of the magnet core 11. This motion, in turn, moves a device, such as a detection head of a magneto-optical disc, connected to the lever 31 of the armature conductor 29.

The electromagnetic energy converter described above is used as an electric motor. The same converter functions as a generator If provision is made to reciprocate the armature conductor 29 by an engine or other device through the lever 31. In this case, an induced voltage is built up in the winding 26 that serves as an output terminal that supplies electric power to a load connected thereto.

The vertically symmetrical structural design of this preferred embodiment increases the utilization factor of the armature conductor 29, as a result of which efficient energy conversion can be achieved with the field magnet consisting of the permanent magnets. Besides, provision of the winding 26 around that portion of the magnet core 11 which is contained in the same cross-section as the armature conductor 29 reduces leakage flux and enhances response.

Now another preferred embodiment of this invention will be described below. Parts similar to those shown in FIGS. 1 to 3 are designated by similar reference characters and detailed description thereof is omitted.

Figure 5:
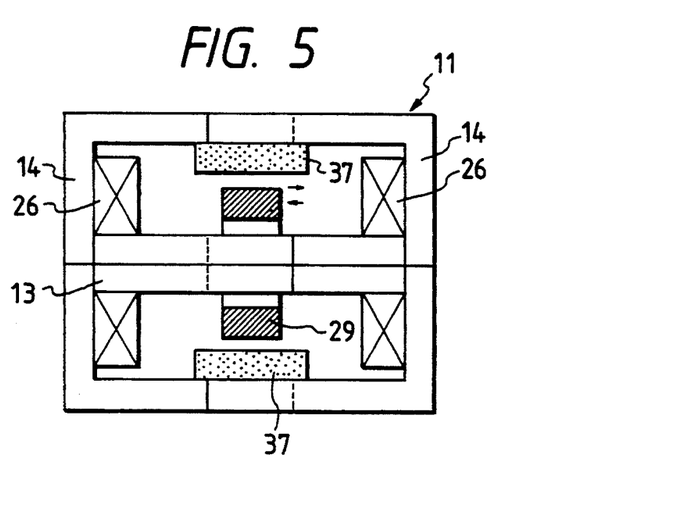
FIG. 5 is a vertical cross-sectional view showing another preferred embodiment of an electromagnetic energy converter according to this invention.

The winding 26 of the embodiment shown in FIG. 1 extends over the entire length of the central core 13. By comparison, the embodiment shown in FIG. 5 has windings 26 provided around both ends of the central core 13 close to the legs 14. The magnet core 11 is a lapped core made up of two facing sets of E,shaped electrical steel. The windings 26 can be readily incorporated in the magnet core 11 by fitting the coils preliminarily wound around bobbins over the central core 13. The windings 26 positioned outside that part of the magnet core 11 which is contained in the same cross section as the permanent magnets 37 and armature conductor 29 permit producing a large output. Because only the central core 13 of the magnet core 11 passes through the armature conductor 29, the armature conductor 29 can be reduced in both size and weight.

Figure 6:
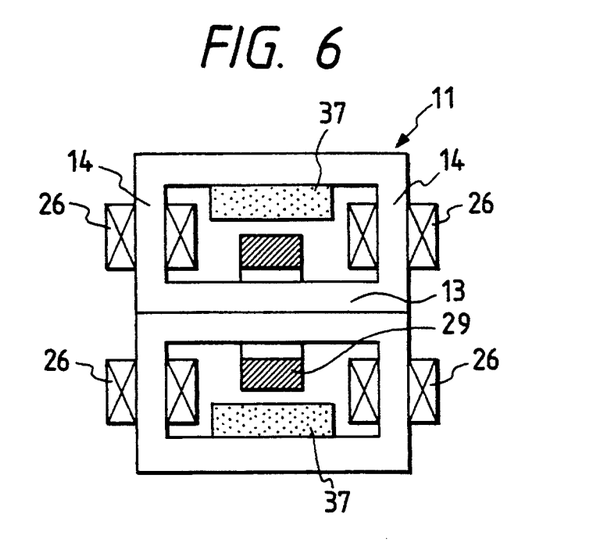
FIG. 6 is a vertical cross-sectional view showing still another preferred embodiment of an electromagnetic energy converter according to this invention.

A preferred embodiment shown in FIG. 6 has windings 26 wound around two legs 14 on both sides. As with the embodiment shown in FIG. 5, the armature conductor 29 of this preferred embodiment can also be reduced in size and weight. Provision of four windings 26, in addition, permits generating a large induced current and producing a large output.

Figure 7:
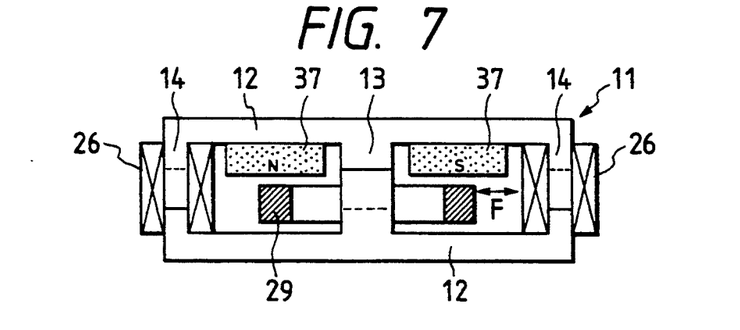
FIG. 7 is a vertical cross-sectional view showing yet another preferred embodiment of an electromagnetic energy converter according to this invention.

A preferred embodiment shown in FIG. 7 has a vertical central core 13, with one yoke 12 carrying two permanent magnets 37 on both sides of the central core 13. Thus, both of the permanent magnets 37 face one side of the armature conductor 29. One winding 26 is wound around each of the two legs 14 on both sides. This arrangement permits flattening of the entire profile of the energy converter. Like the one in the preceding embodiment, the magnet core of this embodiment is a lapped core made up of two facing sets of E-shaped electrical steel. The fact that the legs 14 of the magnet core 11 are shorter than the yokes 12 is conducive to the flattening of the converter profile. One winding 26 is wound around each of the legs 14. This design also permits incorporating preliminarily formed ring-shaped armature conductor 29 and windings 26 in the magnet core 11. Permanent magnets 37 are provided on the inside of the magnet core 11 and in contact with a portion of the yoke 12. The two permanent magnets 37 denoted by N and S are magnetized in opposite directions. While the permanent magnets 37 In the embodiment shown in FIG. 7 are provided on the upper yoke 12 alone, additional permanent magnets may also be provided on the lower yoke on the other side of the armature conductor 29. In other words, the permanent magnets 37 should be provided in contact with at least one of the yokes 12 of the magnet core 11.

Thus, the electrical energy built up in the windings 26 is converted with the mechanical energy of the armature conductor 29 moving in the direction of arrow F. Besides, this embodiment produces a large output because the windings 26 are positioned outside that part of the magnet core 11 which is contained in the same cross section as the permanent magnets 37 and armature conductor 29.

Figure 8:
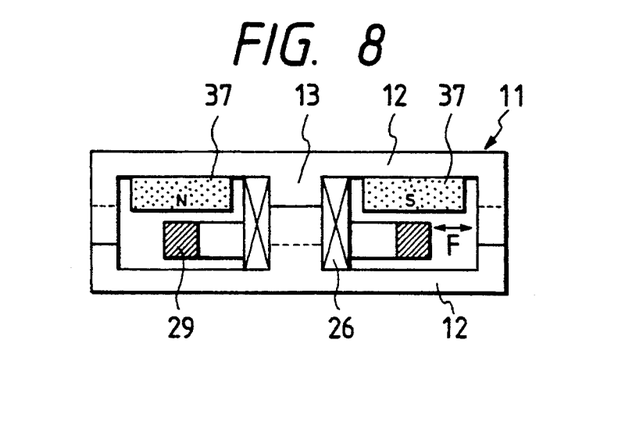
FIG. 8 is a vertical cross-sectional view showing a further preferred embodiment of an electromagnetic energy converter according to this invention.

A preferred embodiment shown in FIG. 8 differs from the one shown in FIG. 7 in that a winding 26 is wound around the central core 13. This preferred embodiment is smaller than the one in FIG. 7. Because the winding 26 provided on that part of the magnet core 11 which is contained in the same cross section as the armature conductor 29, this preferred embodiment exhibits a good response as mentioned before.

Figure 9:
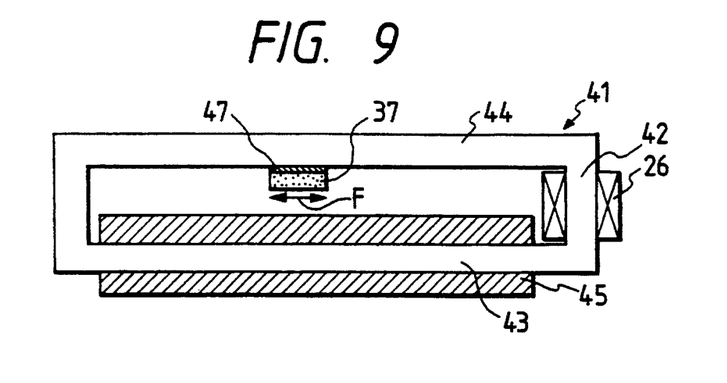
FIG. 9 is a vertical cross-sectional view showing a preferred embodiment of an electromagnetic energy converter according to this invention having a movable field magnet.

FIG. 9 shows a preferred embodiment whose field magnet consists of a movable permanent magnet 37. The magnet core 41 of this embodiment is shaped like a rectangular frame with no central core and consists of legs 42 and yokes 43 and 44. This embodiment has an arm 47 that extends perpendicularly to the plane of the illustration. The arm 47 is supported by a guide (not shown) and movable along the upper yoke 44. A permanent magnet 37 is attached to the tip of the arm 47, while a winding 26 is wound around one of the legs 42. An armature conductor 45 is attached to a magnet core 41 so that the lower yoke 43 passes therethrough. When a voltage changing with time is applied to the winding 26, a magnetic flux develops in the magnet core 41. Then, an induced current flows through the armature conductor 45, whereupon the interaction between the magnetic fluxes produced by the induced current and the permanent magnet 37 causes the movable permanent magnet 37 to move along the upper yoke 44.

Figure 10:
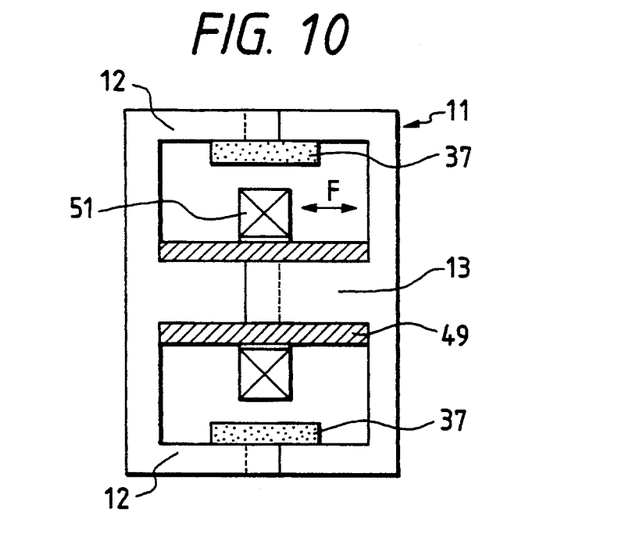
FIG. 10 is a vertical cross-sectional view showing a preferred embodiment of an electromagnetic energy converter according to this invention having a movable winding.

FIG. 10 shows a preferred embodiment having a movable winding. An armature conductor 49 is attached to a magnet core 11 so that the central core 13 of the magnet core 11 passes therethrough. A winding 51 movable along the armature conductor 49 is wound around the armature conductor 49. One permanent magnet 37 is attached to each of the upper and lower yokes 12.

When a voltage changing with time is applied to the winding 51, a magnetic flux develops in the magnet core 11, thereby generating an induced current in the armature conductor 49. The resulting interaction between the magnetic fluxes produced by the induced current and the permanent magnets 37 causes the movable winding 51 to move along the armature conductor 49.

Figure 11:
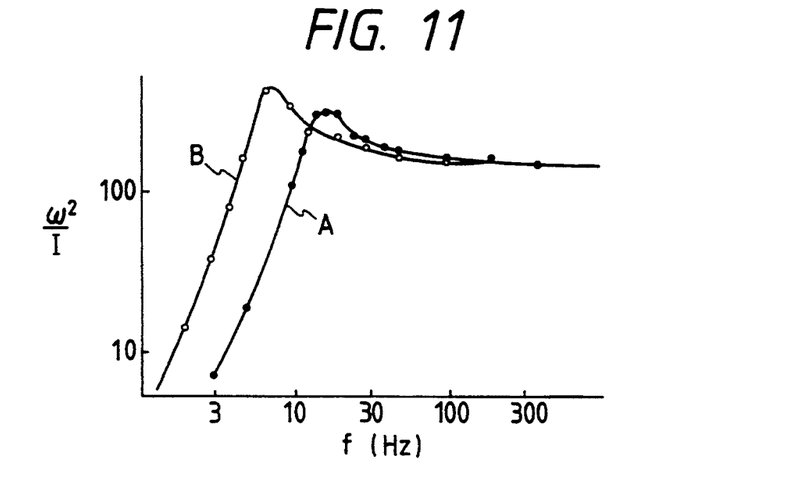
FIG. 11 graphically shows the frequency characteristic of the electromagnetic energy converter shown in FIG. 6.

FIG. 11 shows the frequency characteristic of the electromagnetic energy converter shown in FIG. 6, in terms of the relative value of $\omega^2/I$, where $\omega$ and I respectively represent frequency and the stationary winding and the amplitude of frequency is fixed. The armature conductor of this embodiment is made of aluminum. In Case A, a conductive paste is applied on the contacting surfaces of adjoining aluminum sheets, whereas the same contacting surfaces are nickel-plated in Case B. Obviously, the nickel plating (B) prevents the deterioration at low frequencies more effectively than the conductive paste (A), bringing about a twice greater improvement in terms of frequency.

While all of the embodiments so far described use permanent magnets as their field magnets, electromagnets may also be used in their place.

What is claimed is:

1. An electromagnetic energy converter comprising:
    a magnet core formed of a magnetic material and comprising a central leg, two first legs parallel to said central leg and having respective surfaces facing said central leg, and four second legs connecting both ends of said central leg with each of said first legs, said first legs, said second legs and said central leg forming a closed magnetic path therealong;

an electrically conductive winding wound around said central leg and adapted to connect to a power supply or an electrical load circuit;

an armature conductor having a frame-like body which forms a closed circuit and which is movably mounted about said central leg so as to be movable longitudinally therealong; and two opposing field magnets respectively attached to said surfaces of said first legs which face said central leg, each of said field magnets having two pole faces, one of which is disposed parallel to said central leg, wherein said field magnets are disposed so that a magnetic flux thereof passes through said magnet core and said armature conductor, and wherein said pole faces of said field magnets which face said central leg are of the same polarity.

2. An electromagnetic energy converter according to claim 1, wherein
a readily magnetizable axis of said magnetic material extends along said closed magnetic path.

3. An electromagnetic energy converter according to claim 1, wherein
said magnet core comprises a coiled magnet core.

4. An electromagnetic energy converter according to claim 1, wherein
said magnet core comprises a laminated magnet core.

5. An electromagnetic energy converter according to claim 1, wherein
said magnet core comprises a pair of partially overlapping magnet core portions.

6. An electromagnetic energy converter according to claim 1, wherein
said magnet core is made of a continuous single piece of magnetic material.

7. An electromagnetic energy converter according to claim 1, wherein
said magnet core is made of a sheet-like magnetic material having a thickness of not larger than 0.2 mm.

8. An electromagnetic energy converter according to claim 1, wherein
said magnet core is made of a wire-like magnetic material having a diameter of not larger than 0.2 mm.

9. An electromagnetic energy converter according to claim 1, wherein
said magnet core is made of a magnetic material having an electric resistance of not smaller than 30 $\mu\Omega cm$.

10. An electromagnetic energy converter according to claim 1, wherein
said magnet core is made of a magnetic material that is finely divided into magnetic domains.

11. An electromagnetic energy converter according to claim 1, wherein
said armature conductor is made of copper, aluminum or duralumin.

12. An electromagnetic energy converter according to claim 1, wherein
said armature conductor comprises pieces of a conductive material joined together.

13. An electromagnetic energy converter according to claim 1, wherein
said winding and said armature conductor are disposed with respect to the magnet core so that more than 50% of the magnetic fluxes produced by the currents passing therethrough intersect with each other.

14. An electromagnetic energy converter according to claim 1, wherein
said armature conductor is movably mounted about said central leg so as to be movable in a direction perpendicular to the magnetic flux generated by said field magnet.

15. An electromagnetic energy converter according to claim 1, wherein
said magnet core, said winding, said armature conductor and said field magnets are shaped and disposed substantially symmetrically with respect to a plane parallel with said central leg and extending through a center of said central leg.

16. An electromagnetic energy converter according to claim 1, wherein
said armature conductor is formed of two or more pieces of aluminum or duralumin bonded together, and an oxidation preventive film is formed on mutually contacting surfaces of said two or more pieces.

17. An electromagnetic energy converter according to claim 16, wherein
said oxidation preventive film is formed of nickel or copper plating.

18. An electromagnetic energy converter according to claim 1, wherein
said field magnets respectively comprise permanent magnets.

19. An electromagnetic energy converter according to claim 1, wherein
said magnet core comprises two sets of E-shaped pieces facing each other and partially overlapping one another;

said armature conductor is movable along a longitudinally central predetermined portion of said central leg; and said electrically conductive winding comprises two electrically conductive windings wound around opposing ends of said central leg outside said predetermined central portion of said central leg.

20. An electromagnetic energy converter according to claim 1, wherein
said magnet core comprises two sets of E-shaped pieces facing each other and partially overlapping one another;

said electrically conductive winding is wound around an entire length of said central leg of said magnet core and;

said armature conductor is coaxial with said electrically conductive winding.

21. An electromagnetic energy converter according to claim 1, wherein
an equation $w \geq 2\ gt\mu/l$ is satisfied, wherein g is a gap between overlapped portions of said E-shaped pieces, l is a length of the magnetic path, t and $\mu$ are a thickness and a specific magnetic permeability, respectively, of the magnetic material making up the magnetic core, and w is a width of the overlapped portions.

22. An electromagnetic energy converter comprising:
a magnet core formed of a magnetic material and comprising a central leg, two first legs parallel to said central leg and having respective surfaces facing said central leg, and four second legs connecting both ends of said central leg with each of said first legs, said first legs, said second legs and said central leg forming a closed magnetic path therealong;

four electrically conductive windings respectively wound around said four second legs and being adapted to be connected to a power supply or an electrical load circuit;

an armature conductor having a frame-like body which forms a closed circuit and which is movably mounted about said central leg so as to be movable longitudinally therealong; and two opposing field magnets respectively attached to said surfaces of said first legs which face said central leg, each of said field magnets having two pole faces, one of which is disposed parallel to said central leg, wherein said field magnets are disposed so that a magnetic flux thereof passes through said magnet core and said armature conductor, and wherein said pole faces of said field magnets which face said central leg are of the same polarity.

23. An electromagnetic energy converter according to claim 2, wherein
said magnet core comprises two sets of E-shaped pieces facing each other and partially overlapping one another.

24. An electromagnetic energy converter comprising:
a magnet core formed of a magnetic material and comprising a central leg, two first legs parallel to said central leg and four second legs connecting both ends of said central leg with each of said first legs, said first legs, said second legs and said central leg forming a closed magnetic path therealong;

two electrically conductive windings respectively wound around said two first legs and being adapted to be connected to a power supply or an electrical load circuit;

an armature conductor having a frame-like body which forms a closed circuit and which is movably mounted about said central leg so as to be movable longitudinally therealong; and a first field magnet attached to a first inwardly facing surface of a first of said four second legs which faces said armature conductor, and a second field magnet attached to a second inwardly facing surface of a second of said four second legs which faces said armature conductor, wherein each of said first and second field magnets has two pole faces, at least one of which is disposed perpendicular to said central leg and faces said armature conductor, wherein said first and second field magnets are disposed so that a magnetic flux passes through said magnet core and said armature conductor, and wherein the pole faces of said two field magnets which face said armature conductor are of different polarities.

25. An electromagnetic energy converter according to claim 24, wherein
said magnet core comprises two sets of E-shaped pieces facing each other and partially overlapping one another.

26. An electromagnetic energy converter according to claim 24, wherein
said first and second field magnets are positioned on one side of said armature conductor, and on opposite sides of said central leg.

27. An electromagnetic energy converter comprising:
a magnet core formed of a magnetic material and comprising a central leg, two first legs parallel to said central leg and four second legs connecting both ends of said central leg with each of said first legs, said first legs, said second legs and said central leg forming a closed magnetic path therealong;

an electrically conductive winding wound around said central leg and adapted to connect to a power supply or an electrical load circuit;

an armature conductor having a frame-like body which forms a closed circuit and which is movably mounted about said central leg so as to be movable longitudinally therealong; and a first field magnet attached to a first inwardly facing surface of a first of said four second legs which faces said armature conductor, and a second field magnet attached to a second inwardly facing surface of a second of said four second legs which faces said armature conductor, wherein each of said first and second field magnets has two pole faces, at least one of which is disposed perpendicular to said central leg and faces said armature conductor, wherein said first and second field magnets are disposed so that a magnetic flux passes through said magnet core and said armature conductor, and wherein the pole faces of said two field magnets which face said armature conductor are of different polarities.

28. An electromagnetic energy converter according to claim 27, wherein
said armature conductor is coaxial with said electrically conductive winding.

29. An electromagnetic energy converter comprising:
a magnet core formed of a magnetic material and comprising a first main leg having first and second ends, a second main leg having first and second legs and being parallel to said first main leg, a third leg connecting said first end of said first main leg with said first end of said second main leg, and a fourth leg connecting said second end of said first main leg with said second end of said second main leg, said first and second main legs and said third and fourth legs forming a closed magnetic path therealong;

an electrically conductive winding wound around one of said third and fourth legs and being adapted to connect to a power supply or an electrical load circuit;

an armature conductor attached to and extending along said first main leg; and a field magnet movably mounted to said second main leg so as to be movable longitudinally therealong, said field magnet having two pole faces, at least one of which is parallel to said first main leg and faces said armature conductor.

30. An electromagnetic energy converter comprising:
a magnet core formed of a magnetic material and comprising a central leg, two first legs parallel to said central leg and having respective surfaces facing said central leg, and four second legs connecting both ends of said central leg with each of said first legs, said first legs, said second legs and said central leg forming a closed magnetic path therealong;

an electrically conductive winding movably mounted about said central leg so as to be movable therealong, said winding being adapted to connect to a power supply or an electrical load circuit;

an armature conductor having a frame-like body which forms a closed circuit and which is mounted about said central leg; and two opposing field magnets respectively attached to said surfaces of said first legs which face said central leg, each of said field magnets having two pole faces, one of which is disposed parallel to said central leg, wherein said field magnets are disposed so that a magnetic flux thereof passes through said magnet core and said armature conductor, and wherein said pole faces of said field magnets which face said central leg are of the same polarity.

31. An electromagnetic energy converter according to claim 30, wherein
said armature conductor is disposed coaxially within said winding.

* * * * *